United States Patent [19]

Karpinski, Jr.

[11] Patent Number: 5,335,063
[45] Date of Patent: Aug. 2, 1994

[54] LASER PATH LENGTH CONTROL RESET ACCELERATION CIRCUIT

[75] Inventor: Andrew J. Karpinski, Jr., Clearwater, Fla.

[73] Assignee: Honeywell Inc., Minneapolis, Minn.

[21] Appl. No.: 697,816

[22] Filed: May 9, 1991

[51] Int. Cl.⁵ .................................... G01C 19/66
[52] U.S. Cl. ............................................. 356/350
[58] Field of Search ............................... 356/350

[56] References Cited

U.S. PATENT DOCUMENTS

| | | | |
|---|---|---|---|
| 3,581,227 | 5/1983 | Podgorski | 331/94.5 |
| 4,152,071 | 5/1979 | Podgorski | 356/350 |
| 4,267,478 | 5/1981 | Ljung et al. | 356/350 X |
| 4,320,974 | 3/1982 | Ljung | 356/350 |
| 4,383,763 | 5/1983 | Hutchings et al. | 356/350 |
| 4,597,667 | 7/1986 | Curby et al. | 356/350 |

Primary Examiner—Mark Hellner
Attorney, Agent, or Firm—Robert A. Pajak

[57] ABSTRACT

A ring laser angular rate sensor apparatus includes ring laser apparatus for generating a pair of counter-propagating laser beams about a closed-loop path where the laser beam intensity varies as a function of drive voltage. Path length control apparatus including a transducer drive amplifier apparatus provides a drive signal for variably adjusting the length of the closed loop path so as to acquire a peak laser intensity. Reset acceleration apparatus for selectively applying a bias signal to the path length control apparatus rapidly forces the drive signal in one direction thereby causing the laser intensity corresponding to the drive signal to increase and allows the path length control apparatus to acquire a laser intensity peak. In one embodiment of the invention the reset acceleration apparatus includes apparatus for comparing a predetermined reference signal with a laser intensity signal and switching apparatus, coupled to and controlled by the comparing apparatus, for applying the bias signal. The bias signal is applied by the comparing apparatus when the laser intensity signal falls below the level of the predetermined reference signal.

14 Claims, 2 Drawing Sheets

LASER PATH LENGTH CONTROL RESET ACCELERATION CIRCUIT

The U.S. Government has rights in this invention pursuant to a contract awarded by the Department of the Navy, Contract UA10E4340F.

The present invention relates to lasers and more particularly to ring laser angular rate sensors, sometimes referred to as ring laser gyros. Still more specifically the present invention relates to the mechanization of a path length control apparatus for ring laser gyros where the path length control apparatus includes a reset acceleration circuit apparatus.

BACKGROUND OF THE INVENTION

Ring laser angular rate sensors, sometimes referred to as ring laser gyros, are well known in the art. A detailed description may be found in the "Background of the Invention" of U.S. Pat. No. 4,597,667, which is incorporated herein by reference. Briefly, such sensors include a ring laser supported in a block having plurality of gas containing tunnels. At the intersection of the tunnels are mirrors to define a closed-loop optical path which is traveled by counter-propagating laser beams therein. Practical embodiments of ring laser angular sensors usually include a path length controller. The purpose of the path length controller is to maintain a constant path length. Maintaining a constant path length avoids false rotation errors in the usual sensor output. The path length controller function is usually provided by one of the mirrors being attached to a piezoelectric transducer which controls translational movement of the mirror to effect the laser beam path length in response to a drive signal provided through a transducer drive amplifier.

One technique for maintaining a constant path length is detecting the intensity of one or both of the laser beams and controlling the path length of the ring laser such that the intensity of one or both of the beams is at a maximum. U.S. Pat. No. 4,152,071 which issued May 1, 1979 to T. J. Podgorski, and assigned to the assignee of the present invention illustrates a control mechanism and circuitry as just described. Path length transducers for controlling the path length of the ring laser are well known, and particularly described in U.S. Pat. No. 3,581,227, which issued May 25, 1971 to T. J. Podgorski, also assigned to the assignee of the present invention, U.S. Pat No. 4,383,763, which issued May 17, 1983 to Hutchings et al and U.S. Pat. No. 4,267,478, which issued May 12, 1981 to Bo H. G. Ljung, et al. All these patents are incorporated herein by reference.

In the aforementioned patents, the beam intensity is either detected directly as illustrated in the aforementioned patents, or may be derived from what is referred to as the double beam signal such as that illustrated in U.S. Pat No. 4,320,974, which issued on Mar. 23, 1982 to Bo H. G. Ljung, and is also incorporated herein by reference.

In path length control systems of the prior art, the path length control finds mirror positioning for which the lasing polygon path length, i.e., the ring laser path length, is an integral number of wavelengths of the desired mode or frequency, as indicated by a spectral line, of the lasing gas. With proper design, the path length control forces the path length traversed by the laser beams to be a value which causes the laser beams to be at maximum power. The properly designed ring laser has a maximum power at traverse modes commonly referred to as "axial" or "on axis" modes. There are many longitudinal on-axis modes of operation which satisfy the intended operating condition. Unfortunately, there are other subsidiary parasitic or secondary maximums between different on-axis modes. These parasitic maximums are sometimes referred to as "off-axis" modes. The corresponding laser power at off-axis modes is less than when the laser is operating at the on-axis modes.

Path length control systems of the prior art are intended to operate at the maximum power or on-axis mode so that laser sensor performance is optimum. Operation of the laser sensor at off-axis modes can lead to an introduction of sensor rotation and performance errors. It is sometimes necessary during operation of a ring laser gyro to reset the transducer drive voltage to the center of the transducer drive amplifier's drive range. This reset is usually accomplished by shorting out a capacitor in the integrator within the path length control circuit loop. The path length control circuit control loop will usually drive the mirror transducer so as to acquire the closest laser intensity peak to the reset voltage as is shown graphically in FIG. 2.

Referring now to FIG. 2, a graphical representation of laser beam intensity verses transducer drive voltage is shown. Typically, as is shown in FIG. 2, the laser intensity peaks, for example, 201 and 202 occur near the reset drive voltage and therefore the laser intensity at the reset drive voltage is shown at point 205. In such cases, the path length control circuit will drive the linear transducer 14 so as to acquire the closest laser intensity peak to the reset voltage. In this example, peak 202 will be acquired.

Referring now to FIG. 3, a graphical representation of laser beam intensity verses transducer drive voltage is shown wherein the reset command puts the ring laser gyro in an indeterminant state between laser intensity peaks. In this example, the reset drive voltage intersects the laser intensity at a point 305 which is close to or at the midpoint between two laser intensity peaks 301 and 302. In the prior art, the path length control circuit loop cannot determine which laser intensity peak to acquire and consequently can stay in this indeterminant state between peaks for an unexceptably long duration until either noise or integrator offsets finally allow the loop to determine which peak is closer and, to thereby acquire that peak. The reset acceleration circuit of the present invention solves this problem.

SUMMARY OF THE INVENTION

A ring laser angular rate sensor apparatus is provided comprising ring laser means for generating a pair of counter-propagating laser beams about a closed-loop path wherein the laser beam intensity varies as a function of drive voltage. Path length control means including a transducer drive amplifier means provides a drive signal for variably adjusting the length of the closed loop path so as to acquire a peak laser intensity. Reset acceleration means for selectively applying a bias signal to the path length control means rapidly forces the drive signal in one direction thereby causing the laser intensity corresponding to the drive signal to increase and allows the path length control means to acquire a laser intensity peak.

In one embodiment of the invention the reset acceleration means comprises means for comparing a predetermined reference signal with a laser intensity signal and switching means, coupled to and controlled by the comparing means, for applying the bias signal. The bias signal is applied by the comparing means when the laser intensity signal falls below the level of the predetermined reference signal.

DETAILED DESCRIPTION OF THE INVENTION

Figure 1:
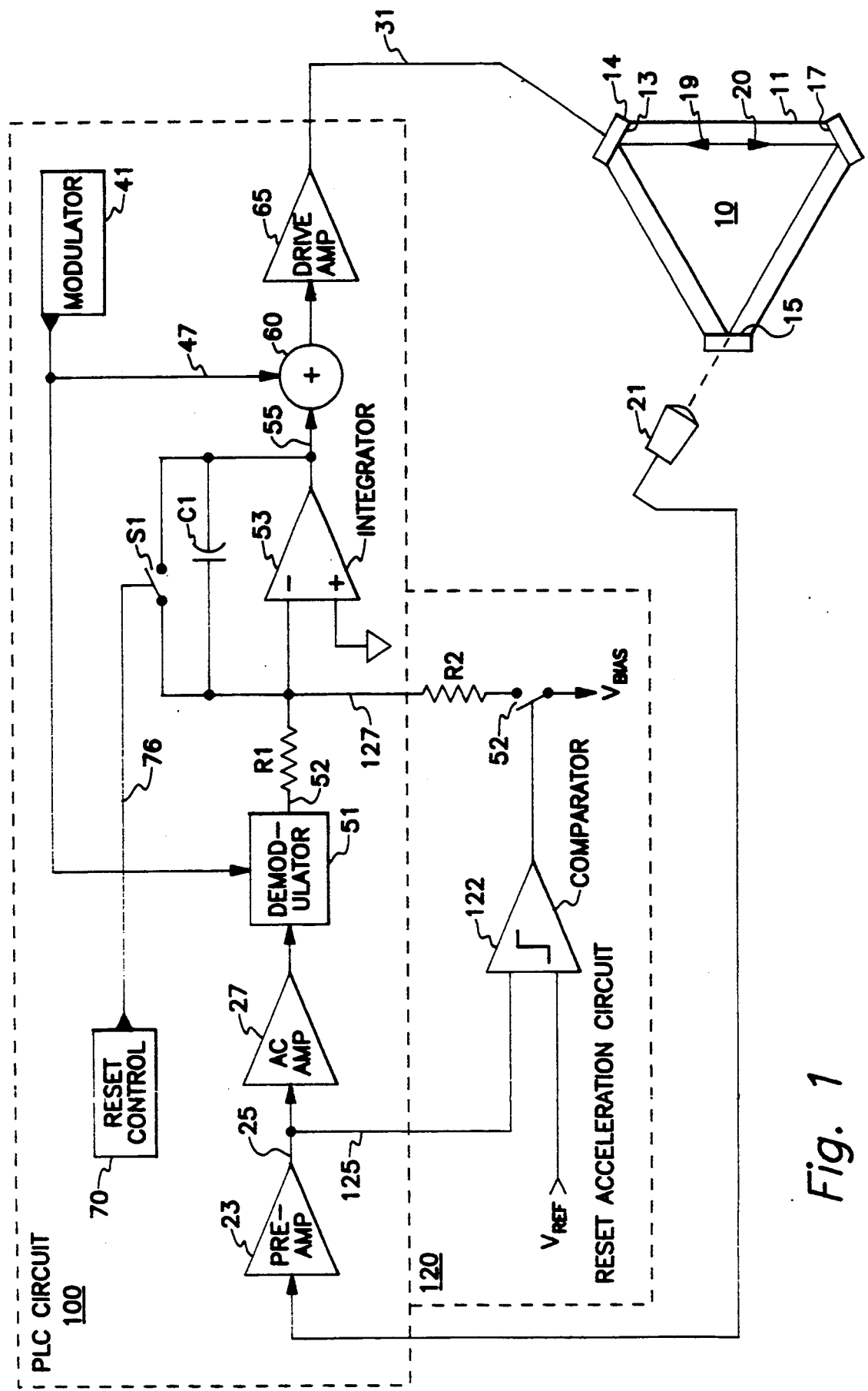
FIG. 1 is a schematic block diagram of a laser angular rate sensor or ring laser gyro and path length control having a reset acceleration circuit in accordance with the present invention.

While the invention will be described through the use of an illustrative example for use with a ring laser gyro, those skilled in the art having the benefit of this disclosure will understand that this description serves only to illustrate the invention and that the invention is not to be considered limited by the examples discussed herein. FIG. 1 shows a triangular laser angular rate sensor, well known in the art, generally depicted by reference numeral 10 and a path length control system comprising path length control (PLC) circuit 100 and reset acceleration circuit 120 in accordance with the present invention. Briefly, the laser angular rate sensor or ring laser gyro 10 is comprised of a laser block 11 and mirrors 13, 15, and 17. Mirrors 13, 15 and 17 define the optical closed-loop path travelled by the laser beams as is well known. Mirror 13 is illustrated as part of a path length control transducer 14 for controlling the total optical path length travelled by the counter-propagating laser beams 19 and 20.

It should be recognized by those skilled in the art that the present invention is applicable to any closed-loop polygon path in addition to the triangular shaped path shown in FIG. 1. The number of mirrors employed by the sensor is dependent on the shape or configuration selected. Nevertheless, at least one of the mirrors, like mirror 13, will generally be coupled to a path length control transducer to perform the same intended function.

Mirror 15 is shown to be partially transmissive for passing a portion of laser beam 20 therethrough to impinge upon a photodetector 21. Mirror 17 may also be transmissive to provide, in part, a readout of the sensor in a well known manner. It should also be recognized by those skilled in the art that mirror 15 may also be part of an optical readout instead of mirror 17.

Still referring to FIG. 1, there shown is beam intensity detection circuitry including photodetector 21, pre-amplifier 23, and AC amplifier 27. This configuration is only exemplary and those skilled in the art will recognize that other configurations will perform the same beam intensity detection function. The output of the photodetector 21 is amplified by pre-amplifier 23 and presented to AC amplifier 27. The output of AC amplifier 27 is an output signal which comprises modulation signals having phasing characteristics representative of the laser beam intensity. The laser beam intensity is a function of the total closed-loop path length travelled by laser beam 20. The output of AC amplifier 27 is then presented to a closed-loop control circuit comprising demodulator 51, modulator 41, reset control 70, an integrator including integrating amplifier 53 and capacitor C1, summing circuit 60 and mirror transducer drive amplifier 65. The demodulator 51 demodulates the incoming signal at the frequency of modulator 41. The demodulator 51 may advantageously be a synchronous demodulator and the modulator 41 may advantageously be an oscillator of the type described in U.S. Pat. No. 4,795,259, for example. The demodulator output signal 52 is presented through resistor means R1 to the inverting input of integrating amplifier 53. Those skilled in the art will recognize that other well known circuits may be employed to provide the function of demodulator 51 and integrating amplifier 53 and that the embodiment shown is by way of illustration and not limitation of the invention. The output of integrating amplifier 53 provides an output signal 55 which serves as a signal for controlling the average position of mirror 13 as will be subsequently described herein below. In order to provide a descriminant signal which can be operated on by closed-loop control circuit, the position of mirror 13 is continuously adjusted in a manner that is determined by the path length control circuitry 100 including integrating amplifier 53, modulator 41, reset control 70 and drive amplifier 65.

In the present invention, the position of mirror 13 is controlled by command signal 31 which is presented to the input of transducer 14. Command signal 31 is shown as the sum of two signal components 47 and 55. Signal component 55, the output of integrating amplifier 53, provides a component signal 31 through summing circuit 60 for controlling the average position of mirror 13. The second signal component 47 of signal 31 causes the position of mirror 13 to dither in a manner as described in, for example U.S. Pat. No. 4,152,071 to Podgorski.

It is sometimes necessary during operation of a ring laser gyro to reset the drive signal 31 from the drive amplifier 65 to the center of the amplifier's drive range. This reset is usually accomplished by shorting out a capacitor C1 connected in parallel with the integrating amplifier 53 within the path length control circuit loop. In operation the reset control 70 provides a reset signal 76 to, for example, switch S1 which provides a short across capacitor C1. When the reset signal 76 is released and switch S1 is opened removing the short across capacitor C1, the path length control circuit control loop will usually drive the linear transducer 14 so as to acquire the closest laser intensity peak to the reset voltage as is shown graphically in FIG. 2.

Figure 2:
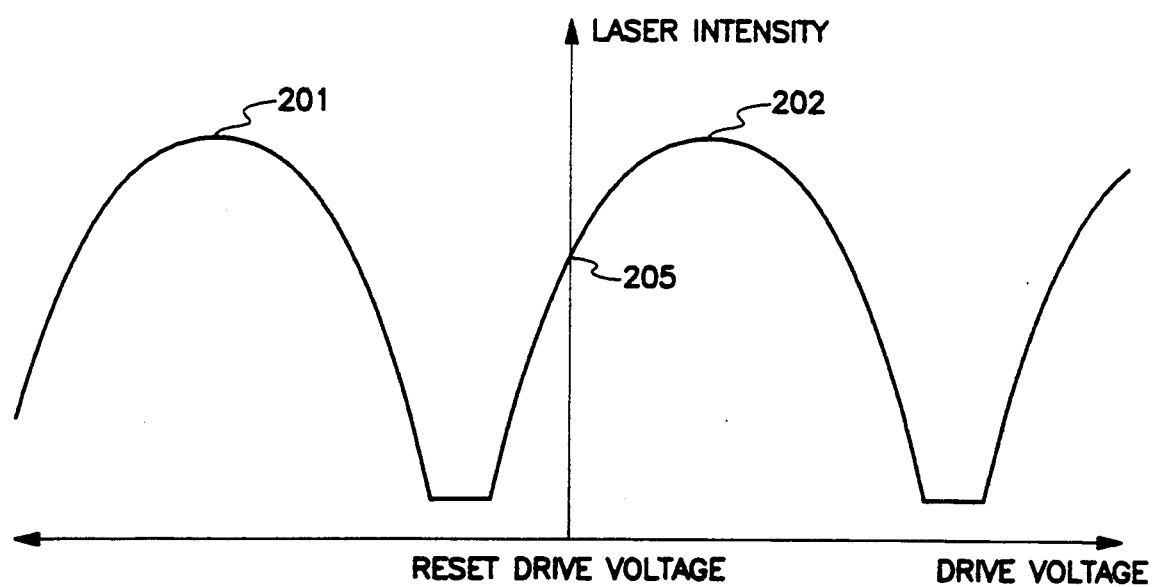
FIG. 2 is a graphical representation of laser beam intensity verses transducer drive voltage.

Referring now to FIG. 2, a graphical representation of laser beam intensity verses transducer drive voltage is shown. Typically, as is shown in FIG. 2, the laser intensity peaks, for example, 201 and 202 occur near the reset drive voltage and therefore the laser intensity at the reset drive voltage is shown at point 205. In such cases, the path length control circuit will drive the linear transducer 14 so as to acquire the closest laser intensity peak to the reset voltage. In this example, peak 202 will be acquired.

Figure 3:
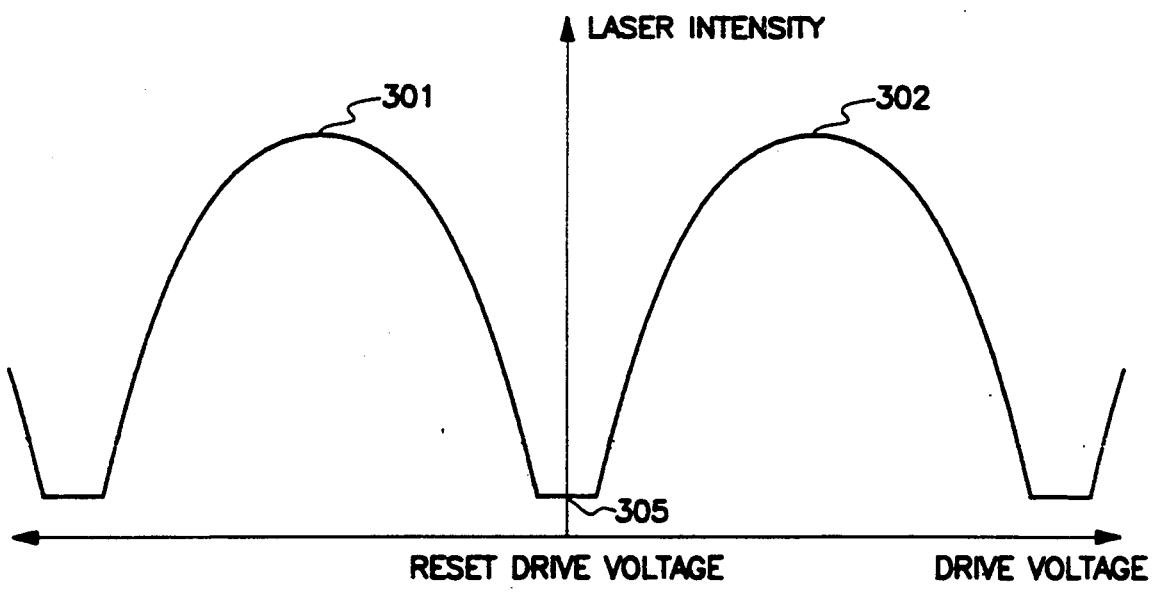
FIG. 3 is a graphical representation of laser beam intensity verses transducer drive voltage in the case where a mode reset command puts the ring laser gyro in an indeterminant state between laser intensity peaks.

Referring now to FIG. 3, a graphical representation of laser beam intensity verses transducer drive voltage is shown wherein the reset command puts the ring laser gyro in an indeterminant state between laser intensity peaks. In this example, the reset drive voltage intersects the laser intensity at a point 305 which is close to or at the midpoint between two laser intensity peaks 301 and 302. If, for the sake of explanation, the reset acceleration circuit of the invention 120 is hypothetically disconnected from the path length control circuit loop, the path length control circuit loop could not readily determine which laser intensity peak to acquire and consequently could stay in this indeterminant state between peaks for an unexceptably long duration. Eventually, either noise or integrator offsets may so affect the transducer drive signal as to finally allow the loop to determine which peak is closer and, to thereby acquire that peak. The reset acceleration circuit 120 comprising the comparator 122, switch S2 and resistance means R2 solves this problem.

Now considering the reset acceleration circuit connected to signal 25 by means of line 125 and to integrating amplifier 53 by means of line 127 as shown. If the laser intensity drops below a predetermined voltage level which may be set at a voltage, $V_{REF}$, the comparator 122 will switch. The output of the comparator 122 will switch in a large bias voltage $V_{BIAS}$ into the integrating amplifier 53 through switch S2 and resistance means R2. This bias will cause the path length control circuit loop to rapidly force the drive voltage provided by the drive amplifier 65 in one direction, eventually causing the laser intensity to increase. When the laser intensity increases beyond the threshold established by the voltage reference, $V_{REF}$, the comparator turns off again, opening the switch S2 and removing the large bias to the integrator. The path length control circuit loop will now continue to acquire the nearest laser intensity peak as it typically would as in the example of FIG. 2. This results in a greatly speeded up acquisition of laser intensity peak for such bothersome reset conditions as shown in FIG. 3.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures can be accomplished without departing from the scope of the invention itself.

What is claimed is:

1. A ring laser angular rate sensor apparatus comprising:
   a. ring laser means for generating a pair of counter-propagating laser beams about a closed-loop path wherein the laser beam intensity varies as a function of a mirror transducer drive signal;
   b. path length control means including a transducer drive amplifier means which provides the mirror transducer drive signal for variably adjusting the length of the closed-loop path so as to acquire a peak laser intensity; and
   c. reset acceleration means for selectively applying a bias signal to the path length control means so as to rapidly force the mirror transducer drive signal in one direction thereby causing the laser intensity corresponding to the mirror transducer drive signal to increase and allowing the path length control means to acquire a laser intensity peak, wherein said reset acceleration means includes,
      means for comparing a predetermined reference signal with a laser intensity signal, and
      bias signal means responsive to said comparing means for applying the bias signal when said comparing means indicates that the laser intensity signal is below the level of the predetermined reference signal.

2. The apparatus of claim 1 wherein the ring laser means includes a mirror transducer driver and wherein the path length control means comprises:
   a. means for detecting the laser beam intensity signal wherein the detecting means provides an output signal;
   b. means for demodulating the detecting means output signal having first and second inputs, and having an output for providing a demodulated signal wherein the first input is coupled to the detecting means;
   c. means for modulating having an output and an input, the modulating means output being coupled to the second demodulator input;
   d. means for signal integrating having first and second inputs and an integration signal output and further having a reset input, wherein the first input is coupled to the demodulator signal and the second input is coupled to the output of the modulating means;
   e. means for resetting coupled to the reset input;
   f. summing means connected to sum the modulation means output and the integration signal output and to provide a summed signal output; and
   g. wherein the transducer drive amplifier means has an input coupled to receive the summed signal output and has an output coupled to the mirror transducer driver.

3. The apparatus of claim 2 wherein the laser beam intensity detecting means comprises:
   a. a photodiode arranged to receive a portion of the laser beam, the photodiode including an output to provide a signal corresponding to the laser beam intensity;
   b. a preamplifier means having an input coupled to the photodiode output; and
   c. an AC amplifier means having an input coupled to the preamplifier output.

4. The apparatus of claim 2 wherein the switching means is coupled at its output terminal to the first input of the integrating means.

5. The apparatus of claim 3 wherein the switching means is coupled at its output terminal to the first input of the integrating means.

6. An improved path length control circuit apparatus for a ring laser angular rate sensor having apparatus for generating a pair of counter-propagating laser beams about a closed-loop path wherein the laser beam intensity varies as a function of a mirror transducer drive signal, the improved apparatus comprising:
   a. path length control means including a transducer drive amplifier means which provides the mirror transducer drive signal for variably adjusting the length of the closed loop path so as to acquire a peak laser intensity; and
   b. reset acceleration means for selectively applying a bias signal to the path length control means so as to rapidly force the mirror transducer drive signal in one direction thereby causing the laser intensity corresponding to the mirror transducer drive signal to increase and allowing the path length control means to acquire a laser intensity peak wherein the reset acceleration means comprises means for comparing a predetermined reference signal with a laser intensity signal, and switching means having a control input and an output terminal, coupled to and controlled by the comparing means at its control input, for applying the bias signal wherein the bias signal is applied when the laser intensity signal falls below the level of the predetermined reference signal.

7. The apparatus of claim 6 wherein the ring laser means includes a mirror transducer driver and wherein the path length control means comprises:
   a. means for detecting the laser beam intensity signal wherein the detecting means provides an output signal;
   b. means for demodulating the detecting means output signal having first and second inputs, and having an output for providing a demodulated signal wherein the first input is coupled to the detecting means;
   c. means for modulating having an output and an input, the modulating means output being coupled to the second demodulator input;
   d. means for signal integrating having first and second inputs and an integration signal output and further having a reset input, wherein the first input is coupled to the demodulator signal and the second input is coupled to the output of the modulating means;
   e. means for resetting coupled to the reset input;
   f. summing means connected to sum the modulation means output and the integration signal output and to provide a summed signal output; and
   g. wherein the transducer drive amplifier means has an input coupled to receive the summed signal output and has an output coupled to the mirror transducer driver.

8. The apparatus of claim 7 wherein the laser beam intensity detecting means comprises:
   a. a photodiode arranged to receive a portion of the laser beam and having an output to provide a signal corresponding to the laser beam intensity;
   b. a preamplifier means having an input coupled to the photodiode output; and
   c. an AC amplifier means having an input coupled to the preamplifier output.

9. The apparatus of claim 8 wherein the switching means is coupled at its output terminal to the first input of the integrating means.

10. The apparatus of claim 7 wherein the switching means is coupled at its output terminal to the first input of the integrating means.

11. An improved path length control circuit apparatus for a laser traveling along a path comprising:
   a. path length control means including a transducer drive amplifier means which provides a drive signal for variably adjusting the length of the path so as to acquire a peak laser intensity; and
   b. reset acceleration means for selectively applying a bias signal to the path length control means so as to rapidly force the drive signal in one direction thereby causing the laser intensity corresponding to the drive signal to increase and allowing the path length control means to acquire a laser intensity peak wherein the reset acceleration means comprises means for comparing a predetermined reference signal with a laser intensity signal, and switching means having a control input and an output terminal, coupled to and controlled by the comparing means at its control input, for applying the bias signal wherein the bias signal is applied by the comparing means when the laser intensity signal falls below the level of the predetermined reference signal.

12. The apparatus of claim 1 wherein the ring laser means includes a mirror transducer driver and wherein the path length control means comprises:
   a. means for detecting the laser beam intensity signal wherein the detecting means provides an output signal;
   b. means for demodulating the detecting means output signal having first and second inputs, and having an output for providing a demodulated signal wherein the first input is coupled to the detecting means;
   c. means for modulating having an output and an input, the modulating means output being coupled to the second demodulator input;
   d. means for signal integrating having first and second inputs and an integration signal output and further having a reset input, wherein the first input is coupled to the demodulator signal and the second input is coupled to the output of the modulating means;
   e. means for resetting coupled to the reset input;
   f. summing means connected to sum the modulation means output and the integration signal output and to provide a summed signal output; and
   g. wherein the transducer drive amplifier means has an input coupled to receive the summed signal output and has an output coupled to the mirror transducer driver.

13. The apparatus of claim 12 wherein the laser beam intensity detecting means comprises:
   a. a photodiode arranged to receive a portion of the laser beam, the photodiode having an output to provide a signal corresponding to the laser beam intensity;
   b. a preamplifier means having an input coupled to the photodiode output; and
   c. an AC amplifier means having an input coupled to the preamplifier output.

14. The apparatus of claim 13 wherein the switching means is coupled at its output terminal to the first input of the integrating means.

* * * * *